United States Patent [19]

Hoinski et al.

[11] 4,177,460

[45] Dec. 4, 1979

[54] TWO-WAY ALARM SAFETY APPARATUS

[75] Inventors: Walter W. Hoinski, Norristown; John J. Simkanich, Yardley, both of Pa.

[73] Assignee: Power Systems Development Corp., Wilmington, Del.

[21] Appl. No.: 838,136

[22] Filed: Sep. 30, 1977

[51] Int. Cl.² .................... G08B 21/00; B60R 27/00

[52] U.S. Cl. .................... 340/576; 180/271; 200/DIG. 2; 340/575

[58] Field of Search .................... 340/279, 575, 576; 180/99; 200/DIG. 2

[56] References Cited

U.S. PATENT DOCUMENTS

| | | | |
|---|---|---|---|
| 3,786,469 | 1/1974 | Massaro et al. | 340/279 |
| 3,903,514 | 9/1975 | Mazzola | 340/279 |
| 3,980,988 | 9/1976 | Spizzo | 340/279 |

FOREIGN PATENT DOCUMENTS

| | | | |
|---|---|---|---|
| 465868 | 9/1951 | Italy | 340/279 |
| 545675 | 7/1956 | Italy | 340/279 |
| 566078 | 8/1957 | Italy | 340/279 |

*Primary Examiner*—Glen R. Swann, III
*Attorney, Agent, or Firm*—Paul & Paul

[57] ABSTRACT

An alarm safety apparatus for use by operators of motor vehicles, transportation equipment, manufacturing equipment and the like for signaling in response to a specific operator movement or position is provided having a multi-directional movement limit alarm preferably including a soft deformable support which may contain a plurality of electric contact switches, at least one each thereof, oriented along each direction of movement of interest; and wherein the plurality of electric contact switches may be electrically connected to signal and power supply components.

10 Claims, 7 Drawing Figures

TWO-WAY ALARM SAFETY APPARATUS

BACKGROUND OF THE INVENTION

Owners and operators of transportation equipment, manufacturing equipment and motor vehicles have tried for some time to develop an inexpensive, reliable, non-confining and non-hazardous alarm apparatus which may be worn by operators of this equipment to signal when the operator has undergone an unacceptable or dangerous motion or position. Preferably such an alarm apparatus could signal when the operator has fallen asleep. Some prior art designs have been developed for this purpose. However, these designs have proven to be cumersome and expensive, as well as provide a safety hazard in case of an accident or an unusual movement on the part of the operator. Moreover, all of these devices are capable of detecting only one type of movement by the operator.

Examples of prior art to this invention are taught by the following United States Patents: U.S. Pat. No. 2,066,092 to Brown; U.S. Pat. No. 2,711,528 to Glossbrenner; U.S. Pat. No. 2,738,496 to Armstrong; U.S. Pat. No. 2,747,038 to Perkovich; U.S. Pat. No. 2,842,628 to James; U.S. Pat. No. 2,916,572 to Ulanit; U.S. Pat. No. 3,054,868 to Phillians; U.S. Pat. No. 3,076,186 to Greene; and U.S. Pat. No. 3,964,045 to Conley.

This prior art teaches rigid structures for supporting classical switch configurations which hold one pole of a switch stationary while permitting movement of the other toward it. Switch movement may be activated by means of a plunger or other rigid apparatus. As an alternative to this first type rigid structure, the prior art teaches a tilt switch situated within a rigid case which is mounted upon the operator's head. This rigid structure, like the rigid switch structure discussed previously, provides a hazard to the operator in an accident situation. As an alternative to the above, a switch trigger mechanism including the lashing of the operator's hand to a fixed position on the vehicle to trip a signal switch has been taught. This latter apparatus obviously limits the movement of the operator's hand. Regardless of the type of structure that has been taught in the prior art, no structure teaches the monitoring of more than one type of motion or position.

What is desired, therefore, is an alarm apparatus which is capable of monitoring more than one type of movement or one position and which does not provide a hazard in an accident situation.

An object of this invention is to provide an operator movement alarm which is small, light-weight and inexpensive as well as does not present a potential accident hazard to the operator.

Another object of this invention is to provide such an alarm apparatus which is capable of signaling when the operator has assumed a specific position or is undergoing a specific motion of his body, such apparatus being capable of signaling more than one such specific position or motion.

Another object of this invention is to provide such an alarm apparatus which is positionable at different locations on the operator's body and which can alarm movement and position of one part of the body with respect to another part of the body, or of one part of the body with respect to an externally fixed object.

A further object of this invention is to provide such an alarm apparatus which will maintain the alarm signal for a fixed period of time regardless of any corrective motion by the operator.

SUMMARY OF THE INVENTION

The objects of this invention are realized in a portable alarm apparatus which will signal in response to a specific body position of the wearer, an operator of a motor vehicle, transportation equipment, manufacturing equipment and the like, who presumably has fallen asleep.

A soft deformable support may be configured to be deformed in a plurality of directions. Preferably this support can be positioned on the operator's body to be deformed in a desired manner by the movement of the body to be detected. A plurality of flexible electrical contact switches may be situated within the support, oriented, at last one each, along a desired axis. Preferably each switch is situated within a cavity within the support wherein the walls of the cavity may have a specific operational relationship to the electromechanical operation of the switch.

One pole of each switch may be connected in parallel to the positive terminai of a battery power source; while the other pole of each switch may be connected in parallel to the negative terminal of this battery. A DC buzzer or other electrical signal component may be connected in series with the parallel connection of the switches to the battery. Circuit connections are such that the closure of anyone of the switches provides an electric current to activate the signal component.

A time-latch component may be connected in parallel across the switches. This time-period latch component operates to preferably continue the activation of the signal component for a fixed period of time after the closure of a switch. This time-period latch operation may be independent of any further switch activity during that fixed period of time.

Preferably the battery, signal component and time-latch component are packaged within a single housing and located away from the deformable support. Electrical connections may be made therebetween. The deformable support may be secured to any part of the body by means of a cuff or collar component. A break away strap may be used to attach the collar to any fixed object such as a support member within the operator's cab.

DESCRIPTION OF THE DRAWINGS

The advantages, structural features and operation of the invention can easily be understood from a reading of the following detailed description of the invention in conjunction with the attached drawings in which like numerals refer to like elements and in which.

DETAILED DESCRIPTION

Figure 1:
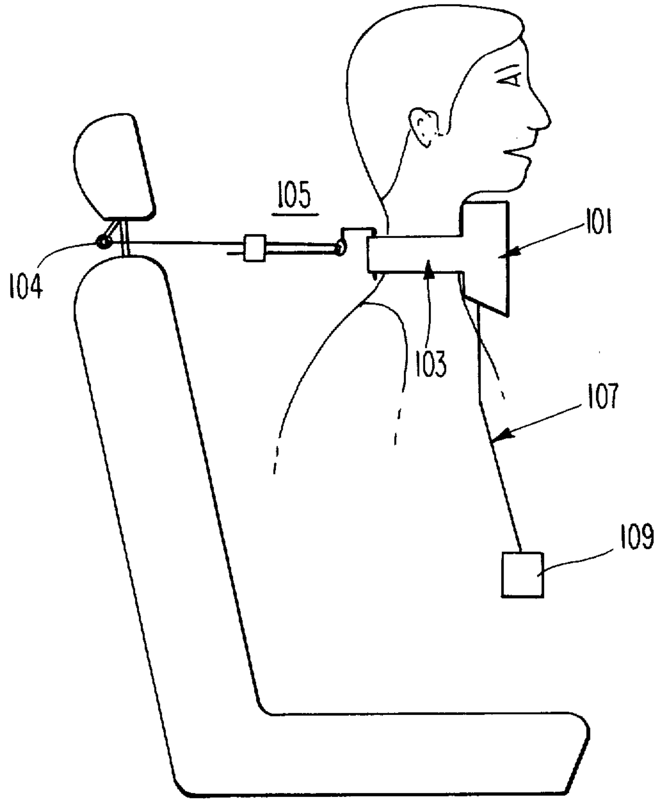
FIG. 1 shows the preferred installation of the alarm apparatus on the operator of a motor vehicle.

FIG. 1 shows the installation of an alarm safety apparatus which may be worn by the operator of a motor vehicle, transportation equipment, manufacturing equipment and the like. This apparatus provides an audible signal when the operator has begun to fall asleep or otherwise assumes a predetermined position. An audible signal is generated when the operator's head drops towards his chest a predetermined distance, or when the operator falls forward away from his fixed seatback. Handicapped operators can utilize the apparatus to intentionally activate a signal which in their use can be an auto horn.

A deformable support 101 is positioned on the chest of the operator directly below his chin. The support 101 is held in position by a two piece collar 103. This collar fits around the neck of the operator. Attached between the collar 103 and a fixed object in the operator's cab, such as a rubber eye hook 104 secured to the headrest or seatback, is a break away strap assembly 105. This strap assembly 105 secures the collar 103 and deformable support 101 to the fixed object eye hook 104. Electric switches contained within the deformable support 101 are electrically connected via wires 107 to a power and alarm box 109. This power and alarm box may be situated in any safe position, such as in the pocket of the operator, which position removes the hazard created by a rigid object in contact with the head and neck of the body. Wire 107 may be of any length to conveniently locate the power and alarm box 109 in the safe position.

Support 101 deforms either when the operator's chin presses it against his chest or the operator's neck crushes it as he falls forward. The deformable support 101, collar 103, break away strap assembly 105, or electrical wires 107 being each of pliable materials do not tend to present a hazard to the operator in an accident situation. The signal and power box 109 while constructed of a rigid material may be placed where it does not present a safety hazard to the operator in an accident.

Figure 2A:
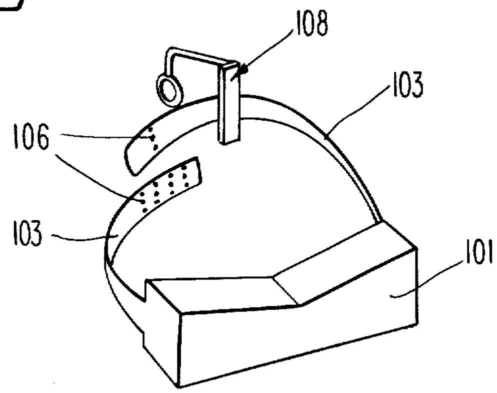
FIGS. 2*a*, 2*b*, and 2*c*, show the physical structure of the deformable support and collar member as well as a preferred cavity and the contact switches located therewithin.
Figure 2B:
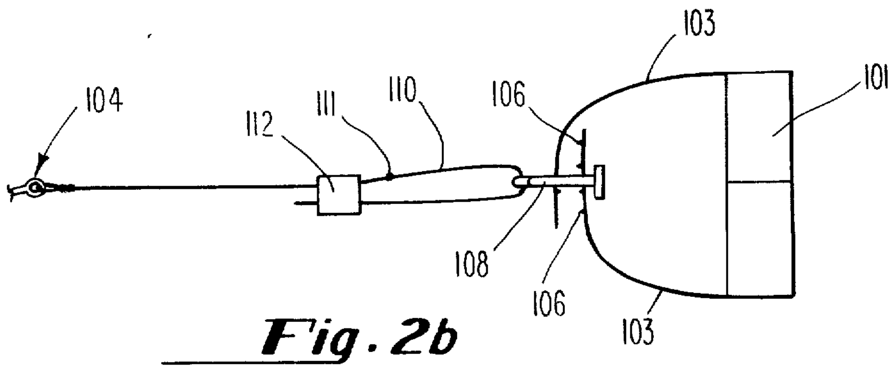

The deformable support 101 can be constructed out of soft deformable material such as sponge rubber, cellulose rubber, and the like. This support 101 can be molded into the shape of an elongated rectangular bow-like structure, much like a foam cushion, FIG. 2*a* which is covered with a fabric or plastic material. This bow-like structure is created by tapering the dimensions of the support 101 to the middle portion thereof. The collar 103 can have two portions which are joined together by means of snap connectors 106 to form the collar, FIG. 2*b*. The collar 103 can be made of plastic fabric and can be glued or sewn to the support 101. Snap connectors 106 can have mating halves on either portion of the collar 103. These snap connectors 106 are installed in rows to enable the collar 103 to be fit to different sizes.

Figure 2C:
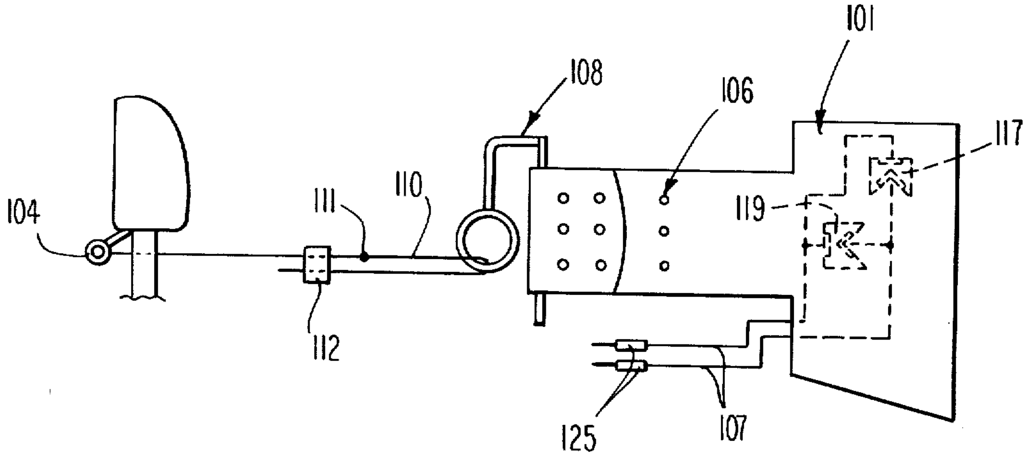

Break away strap assembly 105 includes a break away hook 108, FIG. 2*c*, being "J" shaped and having a closed "eye" loop at the end thereof. The shank of this break away hook 108 is flatly shaped to facilitate insertion behind the collar 103 when it is worn by the operator and to provide a comfortable fit against the neck. The "J" hook 108 is designed to break at its curved section under excessive force such as that experienced in an accident situation.

Also included as part of the break away strap assembly 105 is a securing cord 110 having a position limiting knot 111 and being tied on one end to the anchoring rubber eye hook 104. The securing cord 110 extends through an adjusting block 112 around the eye of the break away "J" hook 108 and loops back through the adjusting block 112.

Adjusting block 112 has a resiliently or spring biased clamp, a cantilevered clamp or other securing means for holding the securing cord 110 at a fixed length. Alternately, the adjusting block 112 may be of plastic material with two parallel holes extending therethrough of a size to snuggly receive the cord 110. With the free end of the cord knotted against block 112, tension on the cord 110 will cause the block 112 to rotate and crimp the cord 110 in this latter design.

Figure 3:
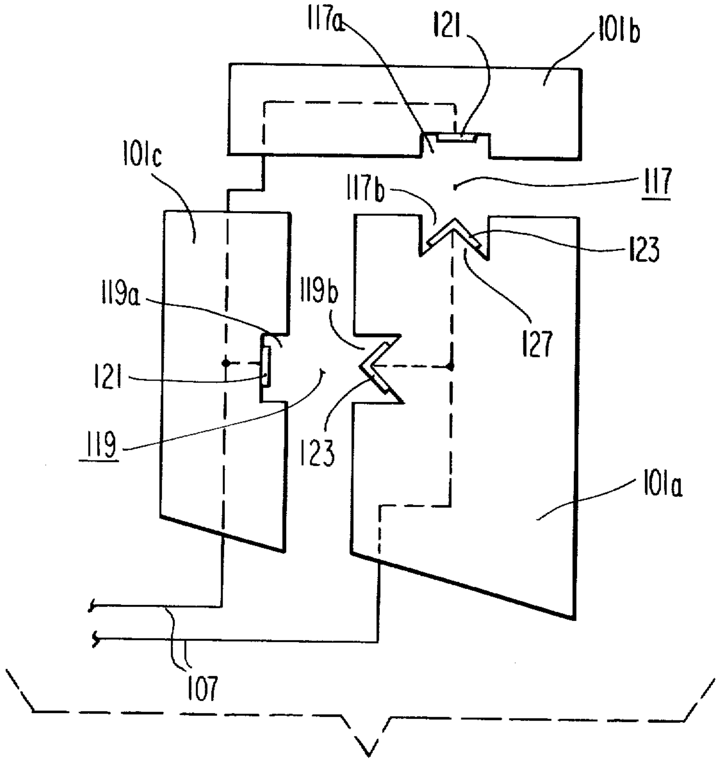
FIG. 3 shows in detail a separated cross-sectional view of the deformable support and switch cavities therewithin.

Located within the deformable support 101, FIG. 2*c* and FIG. 3 in proximity of its narrowest cross-section are a first and second cavities, 117 and 119. Cavities 117 and 119 are identical in size and shape, but are oriented within the support 101 in 90° rotation from one another, with the first cavity 117 being closer to the chin contacting side of the support 101 and the second cavity 119 being closer to the neck contacting side of the support 101. Covering like opposing surfaces of the cavities 117 and 119, respectively, said like opposing surfaces being defined with respect to the 90° rotation, is a first and second flexible electrically conductive film 121 and 123.

Electrically connecting the first electrically conductive film 121 for the cavities 117 and 119 and the second electrically conductive film 123 for the cavities 117 and 119 is a pair of electrical wires 107. Positioned on the free end of each wire 107 is an electrical connector 125. The connectors 125 are of any type commonly used in the electrical arts. Most often, they may be male banana plug-type connectors.

Deformable support member 101 is shown in expanded cross-section in FIG. 3. Here the support 101 is assembled of three portions 101*a*, 101*b*, and 101*c*. These portions are glued or epoxied together to form the complete support member 101. While the support 101 can have parallel sides, the bottom side thereof which is intended to rest upon the chest of the operator may taper, i.e., transverse askew to its opposing side to form a wedge-shaped cushion. The cavities 117 and 119 are positioned perpendicularly with respect to the outer surfaces of the support 101 each having a first cavity portion situated within one deformable support portion and a second cavity portion situated within another deformable support portion. Cavity portions are made by removing material from mating faces of the deformable support 101 portions 101*a*, 101*b*, and 101*c* to form continuous cavities 117 and 119 when the portions 101*a*, 101*b*, and 101*c* are joined to form the deformable support 101.

The first cavity section 117*a* is rectangular in shape having the first electrically conductive film 121 glued to the face of the cavity section 117*a* facing the opening of the cavity section.

The second cavity section 117*b* is rectangularly shaped except for the face facing the opening. This face transcribes an angular projection 127 which projects into the cavity section toward the opening thereof. Covering the angular projection face 127 is the second electrically conductive film 123.

Electrically conductive films 121 and 123 are flexible sheets of copper or aluminum material which have been glued or otherwise adhered to the surfaces which they cover. Extending through the respective portions of the support member 101*a*, 101*b*, and 101*c* are a pair of electrical wires 107. These wires 107 are electrically attached by means of solder or electrically conductive glue, one each, to the respective electrically conductive films 121 and 123. When the support member 101 is crushed, sweezed, or otherwise deformed in a direction along the axis of the switch cavity 117, the support 101 is deformed to bring the conductive films 121 and 123 into electrical contact with one another thus completing the circuit between the wires 107. The second cavity 119 is identically structured to the first cavity 117.

Figure 4:
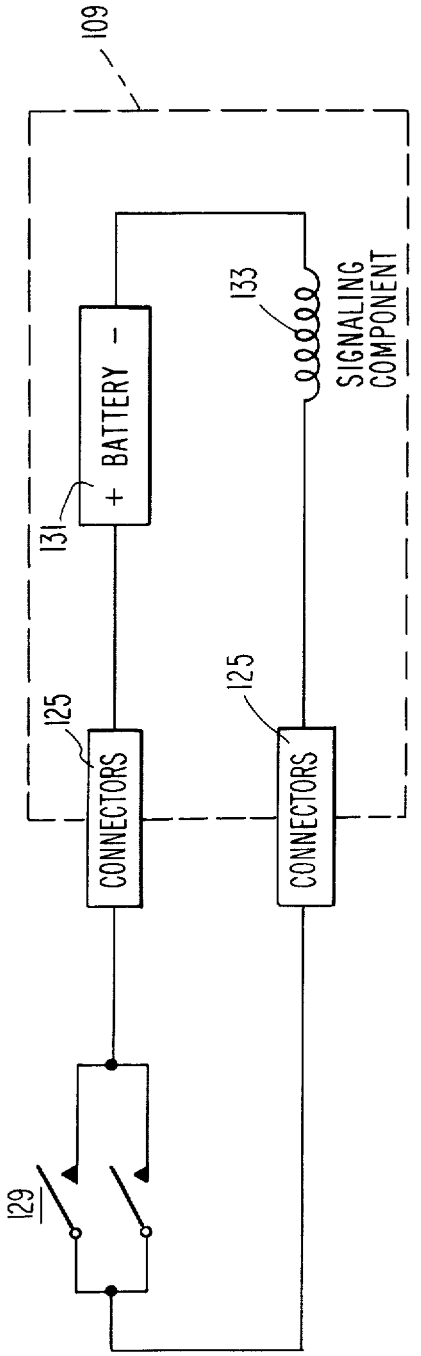
FIG. 4 shows the basic electrical circuit for activating the signal alarm.

FIG. 4 shows the electrical connection for the circuit as well as the other components within the alarm apparatus. The electrically conductive copper sheets 121 and 123 as well as the cavity 117 form one of the switches 129 while the copper sheets 121 and 123 and the cavity 119 form another switch 129. The switches 129 are connected in parallel. One side of the switches 129 via the wire 107 and connectors 125, is connected to the positive terminal of a battery 131. The other side of the switches 129 is connected via the wire 107 and connectors 125 through a signaling component such as an electrical buzzer 133 to the negative terminal of battery 131. Connectors 125 have male and female mating portions thereof. In this embodiment, the battery 131, buzzer 133 and the female mating portion of the connectors 125 may be located within the signal and power box 109.

Figure 5:
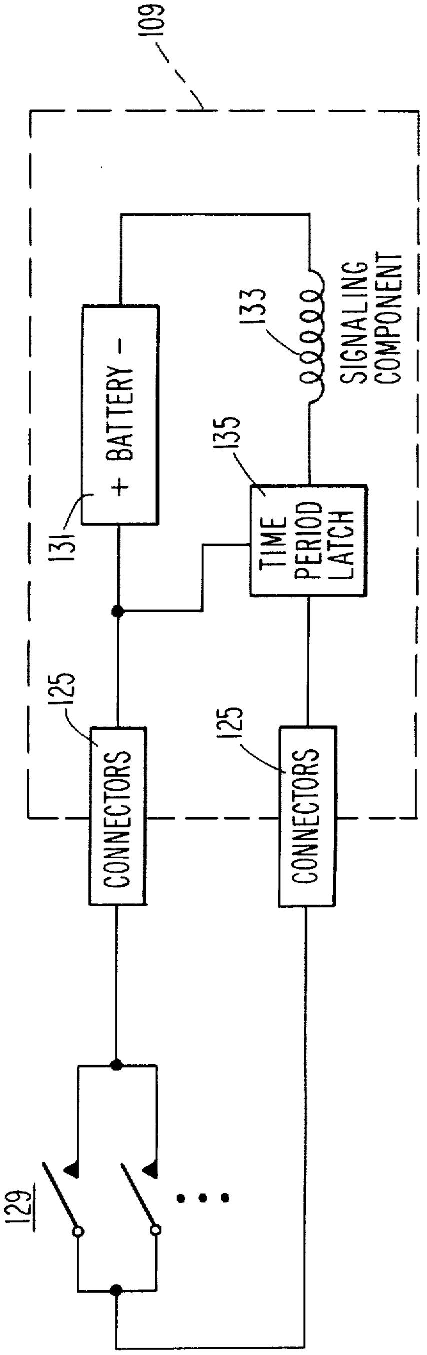
FIG. 5 shows an alternative embodiment of the circuit of FIG. 4 including a time-period latch mechanism for maintaining activation of the alarm for a fixed period of time.

FIG. 4 shows the switch 129 as a dual switch connected in parallel. This switch 129 represents both switches formed by the cavities 117 and 119 within the deformable support 101. An alternative embodiment of the circuitry is shown in FIG. 5. Here the switches 129 may be of a plurality greater than two. Regardless of the number of switches 129 connected in parallel, the connection of the circuit for more than two switches is identical to that of FIG. 4. One pole of the switches 129 is connected via connectors 125 to the positive terminal of a battery 131 while the other pole of the switches 129 is connected via connectors 125 through a buzzer 133 to the negative pole of the battery 131. Shown also in FIG. 5, is a time-period latch component 135, which, in this instance, may be adjusted for maintaining current flow for a 30 second period.

The 30 second latch 135 is located within the signal and power box 109 and is electrically connected between the connector 125 and the buzzer 133. This 30 second latch component 135 also has an electrical connection to the positive terminal of the battery 131. This latch component 135 is activated by the operation of one of the switches 129 to complete the circuit from the positive terminal of the battery 131, thereby activating the buzzer 133. Latch component 135 can be adjusted to remain on for any period once activated by an operation of a switch 129. This latch component remains on for this fixed period regardless of what occurs to the switches 129 during that period.

This alternate structure, FIG. 5, with the latch component 135, will provide a 30 second operation of the buzzer 133 once the switch 129 closes, independently of whether a switch 129 remains closed or not. For an operating condition where the operator's chin begins to bob intermittently, or where the operator falls into a dead sleep and falls sufficiently forward to break the break away section 115 of the strap 105, the buzzer 133 will remain on for a significant period of time, such as 30 seconds, or for whatever predetermined time period the latch component 135 has been adjusted for, sufficient to awaken the operator of the vehicle.

With very few modifications, the circuit of FIG. 4 can be used as a signaling aid for handicapped drivers who must keep both hands on the wheel, gas, and brake control levers and other control components within a special automobile for handicaps, and who can not easily free a hand to blow the horn.

The switches 129 could be connected to control a horn solenoid which solenoid is connected directly between the battery and the horn. In this instance, battery 131 can be the 12 volt auto battery of the car and signal component 133 can be the horn. For this circuit, the switches 129 are not directly in the high current horn line but actuate a solenoid which is. A handicapped driver therefore, using the switch apparatus of this invention, could actuate the auto horn by nodding his head.

While the alarm apparatus structure described herein is directed to the preferred embodiment and an alternative thereto, many changes can be made in the embodiments presented without departing from the intent and scope thereof. It is intended, therefore, that this disclosure be considered in the illustrative sense and not the limiting sense.

What is claimed:

1. An alarm apparatus, capable of being worn by operators of motor vehicles and the like, to signal an undesirable position of one part of the body with respect to another or with respect to a fixed object, comprising:

means for providing an electrically produced signal;

an electrical power source capable of powering said electric signal means;

means responsive to an undesirable position of the body for electrically connecting said electric signal means to said electrical power source, said electrical connection means including two electric switches each being capable of individually electrically connecting said electric signal means to said electrical power source, said switches being positioned to have two distinct planes of operation; and means for securing said electrical connection means to said body.

2. The apparatus of claim 1 wherein said electrical connection means also includes means for maintaining an electrical connection between said electrical power source and said electric signal means for a fixed period of time once a said connection is first provided by one of said switches, independently of further operation of said switches, said maintaining means being connected to the serial connection of said electric signal means and said electrical power source, as well as being connected to said parallel connection of said switches.

3. The apparatus of claim 2 wherein said electric signal means includes an electric buzzer and wherein said electrical power source includes a battery.

4. The apparatus of claim 1, wherein said two electric switches include:

a soft deformable support;

two cavities within said support, each being of similar shape and at a 90° rotated orientation from one another; and two pairs of electrical contacts being situated one pair within each said cavity, said paired electrical contacts being electrically connected in parallel between said power source and said electric signal means.

5. The apparatus of claim 4, wherein each said cavity includes: a protruding angular projecting wall; a first film of electrically conductive material forming one contact of a said electrical contact pair, said film residing on said protruding wall; and a first electrical connection from said first conductive film.

6. The apparatus of claim 5, wherein each said cavity further includes a second electrically conductive film covering the wall facing said first film, said second film forming the other contact of a said electrical contact pair; and a second electrical connection from said second conductive film.

7. The apparatus of claim 1 also including means for anchoring said securing means to said fixed object.

8. The apparatus of claim 7 wherein said securng means includes a collar having two portions each said portion being connected on an end to said soft deformable support, said portions being connectable to one another on their free ends.

9. The apparatus of claim 8 wherein said anchoring means includes:

a break away hook positionable behind said collar at said connectable free end position when said collar is secured to said body; and a cord attached to said break away hook and to said fixed object.

10. The apparatus of claim 9 wherein said anchoring means also includes a clamping block, said cord being passed through said block to clamp said cord at a fixed length.

* * * * *